(12) United States Patent
Kim et al.

(10) Patent No.: US 11,461,638 B2
(45) Date of Patent: Oct. 4, 2022

(54) FIGURE CAPTIONING SYSTEM AND RELATED METHODS

(71) Applicant: ADOBE INC., San Jose, CA (US)

(72) Inventors: Sungchul Kim, San Jose, CA (US); Scott Cohen, Sunnyvale, CA (US); Ryan A. Rossi, Mountain View, CA (US); Charles Li Chen, Athens, OH (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 881 days.

(21) Appl. No.: 16/296,076

(22) Filed: Mar. 7, 2019

(65) Prior Publication Data

US 2020/0285951 A1    Sep. 10, 2020

(51) Int. Cl.
*G06N 3/08* (2006.01)
*G06N 3/04* (2006.01)
(Continued)

(52) U.S. Cl.
CPC .............. *G06N 3/08* (2013.01); *G06F 40/56* (2020.01); *G06K 9/6232* (2013.01); *G06K 9/6259* (2013.01); *G06N 3/0454* (2013.01)

(58) Field of Classification Search
CPC ...... G06N 3/08; G06N 3/0445; G06N 3/0454; G06N 3/0472; G06N 20/00; G06N 20/70; G06N 5/04; G06N 5/02; G06F 16/55; G06F 17/16; G06F 40/169; G06F 40/205; G06F 40/56; G06F 16/535; G06F 16/583; G06F 40/216; G06F 40/284; G06F 40/30; G06F 40/44; G06F 40/174; G06F 40/279; G06F 40/289; G06F 40/295; G06F 16/3347; G06F 16/51; G06F 16/53; G06F 16/532; G06F 16/5846; G06V 10/82; G06V 10/40;
(Continued)

(56) References Cited

U.S. PATENT DOCUMENTS

6,972,763 B1 * 12/2005 Millett .................... G06F 9/451
                                                                345/440
7,249,328 B1 *  7/2007 Davis .................... G06F 40/111
                                                                715/210
(Continued)

*Primary Examiner* — Ian L Lemieux
(74) *Attorney, Agent, or Firm* — Shook, Hardy & Bacon L.L.P.

(57) ABSTRACT

Embodiments of the present invention are generally directed to generating figure captions for electronic figures, generating a training dataset to train a set of neural networks for generating figure captions, and training a set of neural networks employable to generate figure captions. A set of neural networks is trained with a training dataset having electronic figures and corresponding captions. Sequence-level training with reinforced learning techniques are employed to train the set of neural networks configured in an encoder-decoder with attention configuration. Provided with an electronic figure, the set of neural networks can encode the electronic figure based on various aspects detected from the electronic figure, resulting in the generation of associated label map(s), feature map(s), and relation map(s). The trained set of neural networks employs a set of attention mechanisms that facilitate the generation of accurate and meaningful figure captions corresponding to visible aspects of the electronic figure.

20 Claims, 6 Drawing Sheets

(51) Int. Cl.
*G06K 9/62* (2022.01)
*G06F 40/56* (2020.01)

(58) Field of Classification Search
CPC ...... G06V 10/751; G06V 20/30; G06V 20/35; G06V 2201/10; G06V 30/10; G06V 30/413; G06K 9/6232; G06K 9/6256; G06K 9/6259; G06K 9/6257; G06K 9/6268; G06K 9/6271; G06T 11/60
See application file for complete search history.

(56) References Cited

U.S. PATENT DOCUMENTS

| | | | |
|---|---|---|---|
| 8,667,385 B1* | 3/2014 | Mui | G06F 16/904 |
| | | | 715/205 |
| 11,288,324 B2* | 3/2022 | Shekhar | G06F 16/90344 |
| 2002/0158903 A1* | 10/2002 | Janakiraman | G06F 16/9577 |
| | | | 715/746 |
| 2003/0131315 A1* | 7/2003 | Escher | G06N 3/126 |
| | | | 715/255 |
| 2006/0136803 A1* | 6/2006 | Erol | G06F 40/20 |
| | | | 715/202 |
| 2013/0246436 A1* | 9/2013 | Levine | G06F 40/279 |
| | | | 707/741 |
| 2015/0242384 A1* | 8/2015 | Reiter | G06F 40/186 |
| | | | 715/202 |
| 2017/0185835 A1* | 6/2017 | Appel | G06V 30/422 |
| 2019/0228099 A1* | 7/2019 | Bajaj | G06F 16/38 |
| 2019/0266395 A1* | 8/2019 | Yu | G06V 10/56 |
| 2019/0266434 A1* | 8/2019 | Yu | G06V 10/426 |
| 2020/0058145 A1* | 2/2020 | Reiter | G06T 11/60 |
| 2021/0271705 A1* | 9/2021 | Koh | G06N 3/0454 |

* cited by examiner

FIGURE CAPTIONING SYSTEM AND RELATED METHODS

BACKGROUND

There are a variety of use cases where the automated generation of natural language descriptions for digital images, otherwise known as captions, can be beneficial. For instance, caption generation can be useful for indexing or searching digital photographs, or for facilitating content-recognition of digital images for the visually-impaired, among other things. While caption generation for digital images has garnered significant attention in the computer vision space, generating captions for electronic figures depicting quantified data, such as bar charts, pie charts, line plots, and the like, has been a challenge. Electronic figures, unlike digital images, generally visually represent multiple sets of quantified data. While characteristics of electronic figures, such as labels, relative values and relationships, or trends, among other things, can typically be identified by human sight, computer vision-based systems generally have a difficult time deciphering these more complex characteristics. Moreover, while captions generated for digital images can be relatively concise, captions for electronic figures need to be more analytical and thoughtful in order to accurately describe the content.

SUMMARY

Embodiments of the present invention relate to techniques for generating electronic figure captions. More specifically, systems and methods are disclosed relating to a reasoning and sequence-level training approach to automatically and accurately generate captions for an electronic figure. As conventional techniques are limited in application, disclosed embodiments can optimize resource consumption and improve accuracies associated with the automated generation of captions for electronic figures. Disclosed herein are embodiments for generating a training dataset employable to train a recurrent neural network for electronic figure captioning. Additional embodiments are further disclosed relating to the training and employment of different attention models, each being adapted to handle unique aspects of figure caption generation. For instance, the attention models can be employed to calculate weights for specific characteristics of electronic figures, such as labels, visual aspects, relationships between labels, or any combination thereof. In this way, the weights calculated by one or more of the attention models can enable the figure caption to be generated with a stronger emphasis on any one or more of the above characteristics. Also disclosed are embodiments for employing an encoder-decoder framework to translate detected characteristics of electronic figures into accurate and comprehensive figure captions with a relatively high level of confidence.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

As technology advances, and the demand for more speed and power increases, some tasks continue to rely on human intervention to derive a satisfactory result. For instance, automation has proved a high level of utility in various industries that typically include repetitious tasks with minimal variation, while other industries requiring more complex tasks continue to rely on human intervention that provides real-time guidance to indifferent computers, which can only cover a range of tasks for which it has been programmed to perform. Hence, industries where the workforce must account for variability and complexity have since remained stagnant with regard to the implementation of computer-facilitated automation.

Recent developments have brought forth working implementations of once-theoretical concepts that have enabled computers to learn and/or advance its own skillset based on training data, among other things. Neural networks can consume training data to establish a foundation of high-confidence correlations from which they can rely on at a later time to make an "informed" decision based on calculated probabilities, among other things. In this way, neural networks are enabling the automation of more complex tasks across a broader range of difficulties.

One particular task that has traditionally been "guided" by human intervention is the generation of captions for digital assets, such as digital images (e.g., photographs), among other things. Many advancements in computer vision and natural language technologies have facilitated the automated generating of captions for digital images, which generally describe on a high level, depicted subjects or actions identified therein. By way of example, the famous V-J Day in Times Square photograph processed by a conventional image captioning system could potentially generate a corresponding caption in the likes of "man kissing woman on city street." While quite the innovation, such advancements in image captioning have yet to be effectively utilized to overcome the challenges associated with more complex visual representations of quantified data, as is found among various types of electronic figures.

In a related effort, visual question answering (VQA) technologies typically employ a trained neural network or linear classifier to answer given queries about a provided electronic figure. More specifically, a VQA system includes a neural network that is trained with a plurality of figures and corresponding questions. The VQA system takes an electronic figure and a query (e.g., "is this a bar graph?") about the electronic figure as an input and, in turn, generates a relatively short and simplistic answer (e.g., "yes") to the query as output. As VQA technologies have greater significance to advancements in recent figure captioning efforts, the technologies still fall short with respect to optimizing workflow and computing resource expenditure, and more importantly for generating a complete and meaningful caption for a provided electronic figure without additional input.

Unlike a digital image that typically depicts subjects posing or performing an action, an electronic figure can generally depict a set of quantified data in an intuitive and meaningful format (e.g., line graphs, bar graphs, histograms, pie figures, pictograms, Cartesian graphs, among others). Each piece of quantified data can be depicted having a corresponding variety of relevant (e.g., visibly apparent) characteristics. In some aspects, the relevant "characteristics" associated with a piece of quantified data can be primarily qualitative, such as having a color or a shape (e.g., a data point, a bar, a line, a pie piece, a figure). In some other aspects, the relevant characteristics can be both qualitative and quantitative, such as having a corresponding length, height, width, value, set of coordinates, number or count, or position, among other things. Further, each piece or the pieces of quantified data can be associated with one or more depicted pieces of qualitative data or "labels," such as a corresponding title, data dimension, variable name, category, date and/or time, identifier, value, range, axis name, and the like, or any combination thereof, which qualitatively defines the depicted piece(s) of quantified data and/or one or more qualitative and/or quantitative characteristics.

Moreover, as an electronic figure can depict many pieces of quantitative data and/or qualitative data, other relevant characteristics or "relationships" associated with the electronic figure that are not independently defined, yet visibly apparent, can be extremely important to the generation of a complete and accurate caption. For instance, relationships between two more pieces of quantified data, which can be portrayed based on their depicted relative qualitative and/or quantitative characteristics, can be important to caption generation because, in many cases, a fundamental purpose of an electronic figure is to visually represent the pieces of quantified data such that one can easily identify apparent relationships. For instance, a first bar associated with a first label can be taller or longer than a second bar associated with a second label. Similarly, a first line associated with a first can be higher or above a second line associated with a second label. In some instances, a label or characteristic associated with the label can be greater than or less than a plurality of other labels or characteristics associated with such other labels, if not all other labels or corresponding characteristics, by way of example.

Conventional technologies in computer vision and caption generation generally fall short when dealing with electronic figures. When applied to electronic figures, these conventional techniques simply cannot produce meaningful descriptions (e.g., captions) given the more nuanced, quantitative and comparative complexities. In fact, conventional technologies may determine that a figure is depicted, or at best determine an answer given a specific query about a depicted visual characteristic. Even at a high level, the captions generated utilizing such techniques are still non-descriptive, as figure captions need to convey meaningful information about all of the depicted quantitative data, whether summarily or in detail. As such, conventional technologies merely skim the surface of figure caption generation.

The term "electronic figure," referenced herein, is not intended to be limiting, and may include any form of electronic or digital document to which the described embodiments can be applied, including a digital photograph, a digital media, a digital video, a digital animation, a digital illustration, or any frame or portion thereof. In some aspects, it is contemplated that a figure is depicted within the electronic or digital document. Further, as the term "determination" or "generation" of a caption for an electronic figure (also referenced herein as a "figure caption") is utilized herein, such terms are not intended to relay the intent of 100% accuracy, but instead are representative of a high-confidence or high-probability determination that a selected sequence of words or terms (e.g., a natural language sentence) accurately describes the relevant characteristics of quantified data piece(s) and their relationships depicted in the electronic figure.

Aside from the benefits of automation, such as long-term time and cost savings, neural networks provide a wide range of utility across many aspects of technology. For instance, provided that a neural network is properly trained, its integration into a complex technical workflow can, as noted, remove the factor of human error. Further, in some implementations, operations which were once central processing unit (CPU)-intensive can now be offloaded to a graphics processing unit (GPU) having a much higher parallelized throughput, freeing up CPU resources for other tasks there were once bogged down by conventional systems. With particular regard to figure caption generation, not only do the aforementioned features present themselves as clear benefits, but a neural network trained in accordance with some embodiments described herein can generate figure captions that are meaningful (e.g., relevant, quantitative, and/or comparative), which conventional technologies have failed to do.

Some embodiments of the present disclosure are generally directed to an optimized technique for generating a training dataset. More specifically, a training dataset having a plurality of electronic figures and a corresponding plurality of figure captions that describe visual characteristics of the electronic figures can be quickly generated. The generated training dataset, in some further embodiments of the present disclosure, can be employed to train a set of neural networks configured in an encoder-decoder model. The set of neural networks, once trained based on the generated training dataset, can be employed to generate meaningful figure captions for a provided electronic figure in accordance with some further embodiments of the present disclosure. In other words, an electronic figure can be provided to the trained set of neural networks, so that the trained set of neural networks can responsively analyze the electronic figure and generate a corresponding set of figure captions for association with the electronic figure.

More specifically, in some embodiments, a training dataset generating component obtains a plurality of electronic figures that each includes a corresponding visual representation of a corresponding set of quantified data. Each figure in the plurality of electronic figures is associated with a corresponding set of question-answer pairs, each question-answer pair corresponding to one or more visually-identifiable characteristics of the corresponding visual representation. In some aspects, the plurality of electronic figures can include a VQA dataset, having at least one electronic figure associated with defined questions and answers relating to one or more pieces of quantified data depicted in the electronic figure. For each figure in the plurality of electronic figures, the training dataset generating component converts each associated question-answer pair into a corresponding figure caption that, in essence, paraphrases the associated question-answer pair into a natural language statement of fact. In this way, each electronic figure in the training dataset can be associated with a set of natural language statements that describe visually-identifiable characteristics, as opposed to mere question-answer pair(s). In some aspects, the training dataset generating component methodically or randomly selects a defined caption template to facilitate the conversion of a question-answer pair to a corresponding figure caption. In this way, a diverse set of figure captions is generated. Having converted the corresponding set(s) of question-answer pairs into corresponding set(s) of figure captions, a training dataset of electronic figures that are each associated with or include a corresponding set of natural language figure captions is generated.

In some embodiments, a training dataset is provided as an input to a set of neural networks for purposes of training. More specifically, a computing device, such as a neural network host, receives a training dataset as training data. The neural network host extracts the label(s) associated with each electronic figure to generate therefrom a corresponding set of label maps. Each electronic figure from the obtained training dataset is provided to a set of neural networks configured in an encoder-decoder with attention neural network framework. In other words, the set of neural networks configured in an encoder-decoder model incorporates one or more attention mechanisms to facilitate the alignment and translation of information encoded from the training dataset to the captions associated therewith. Thus, the set of neural networks includes an encoding subset comprising a residual neural network (a "ResNet") for detecting visual characteristics of the electronic figure to generate a corresponding set of feature maps, and a reasoning neural network (a "Reasoning Net") for generating a corresponding set of relation maps based on the generated corresponding set of feature maps. Additionally, the set of neural networks includes a decoding subset comprising a recurrent neural network (e.g., a "LSTM" neural network). One or more attention mechanisms can be selected and/or employed by the recurrent neural network for determining (e.g., calculating) weights based on one or more of the corresponding maps and the captions associated with the electronic figure.

The set of neural networks of the encoder-decoder framework is arranged such that the training dataset can be communicated thereto for collectively training the set of neural networks (e.g., the encoding subset and decoding subset) end-to-end. The encoding subset receives the training dataset to detect visual characteristics (e.g., the ResNet) associated with the electronic figures, and further detect relationships (e.g., the Reasoning Net) between various detected visual characteristics of the electronic figures. Given one or more attention mechanisms selected or implemented as part of the encoder-decoder framework, along with each figure's detected visual characteristics, detected relationships, associated labels, and associated captions, a hybrid technique that incorporates sequence level training and reinforcement learning is employed to train the set of neural networks. In various embodiments, at least a portion of a plurality of neural network neurons of the set of neural networks can be modified during the training process.

In some embodiments, an electronic figure (e.g., not of the training dataset) is obtained by a computing device, such as the neural network host having a trained set of neural networks configured in an encoder-decoder with attention neural network framework. The electronic figure includes a visual representation of a set of quantified data and a set of labels associated with the visually-represented set of quantified data. The electronic figure is provided as an input to the neural network host. The associated set of labels is extracted from the provided electronic figure to generate a corresponding set of label maps. The trained encoding subset receives the electronic figure to detect (e.g., via the ResNet) visual characteristics associated with the electronic figure and generate a corresponding set of feature maps therefrom. The trained encoding subset further generates (e.g., via the Reasoning Net) a corresponding set of relation maps based on the generated set of feature maps. The trained decoding subset (e.g., LSTM) receives the generated set of feature maps, the generated set of relation maps, and the generated set of label maps as input. The trained decoding subset employs a set of attention mechanisms for calculating weights over the set of feature maps, the set of label maps, and/or the set of relation maps, to align and translate the received input(s) to one or more words based on the received input, thereby generating a caption that describes the visual representation of the electronic figure in a meaningful and accurate way.

Figure 1:
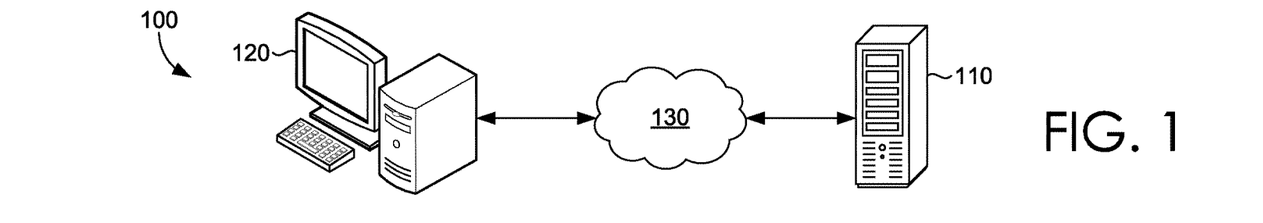
FIG. 1 is an exemplary operating environment of an electronic figure captioning system described in accordance with some embodiments of the present invention.

Turning now to FIG. 1, a schematic depiction is provided illustrating an exemplary system 100 in which some embodiments of the present invention may be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 in FIG. 1 includes a neural network host 110 (e.g., one or more servers or other computing devices). In some instances, the neural network host 110 can be accessed directly or indirectly over a direct connection or an indirect connection, such a network 130 (e.g., a LAN or the Internet). In this non-limiting example, the neural network host 110 can send and/or receive transmissions to and/or from a client device 120 (e.g., a terminal). It is contemplated, however, that any configuration for accessing and/or managing the neural network host 110 can be employed. For instance, the neural network host 110 can be accessed and/or managed directly or indirectly through one or more network connections. Moreover, a database (not shown) or any other memory device or storage component, can also be included in the system 100 to facilitate storage and/or retrieval of data (e.g., electronic figure(s), training data) by any one of the illustrated components.

The neural network host 110 can include a set of neural networks that is trained, or can be trained, based on a provided training dataset. The trained set of neural networks can generate figure captions for a provided (e.g., received) electronic figure without having any prior knowledge or previous exposure to the electronic figure. As noted, in some embodiments, the neural network of the neural network host 110 is trained with a training dataset that has figure captions associated with each electronic figure included therein.

Figure 2:
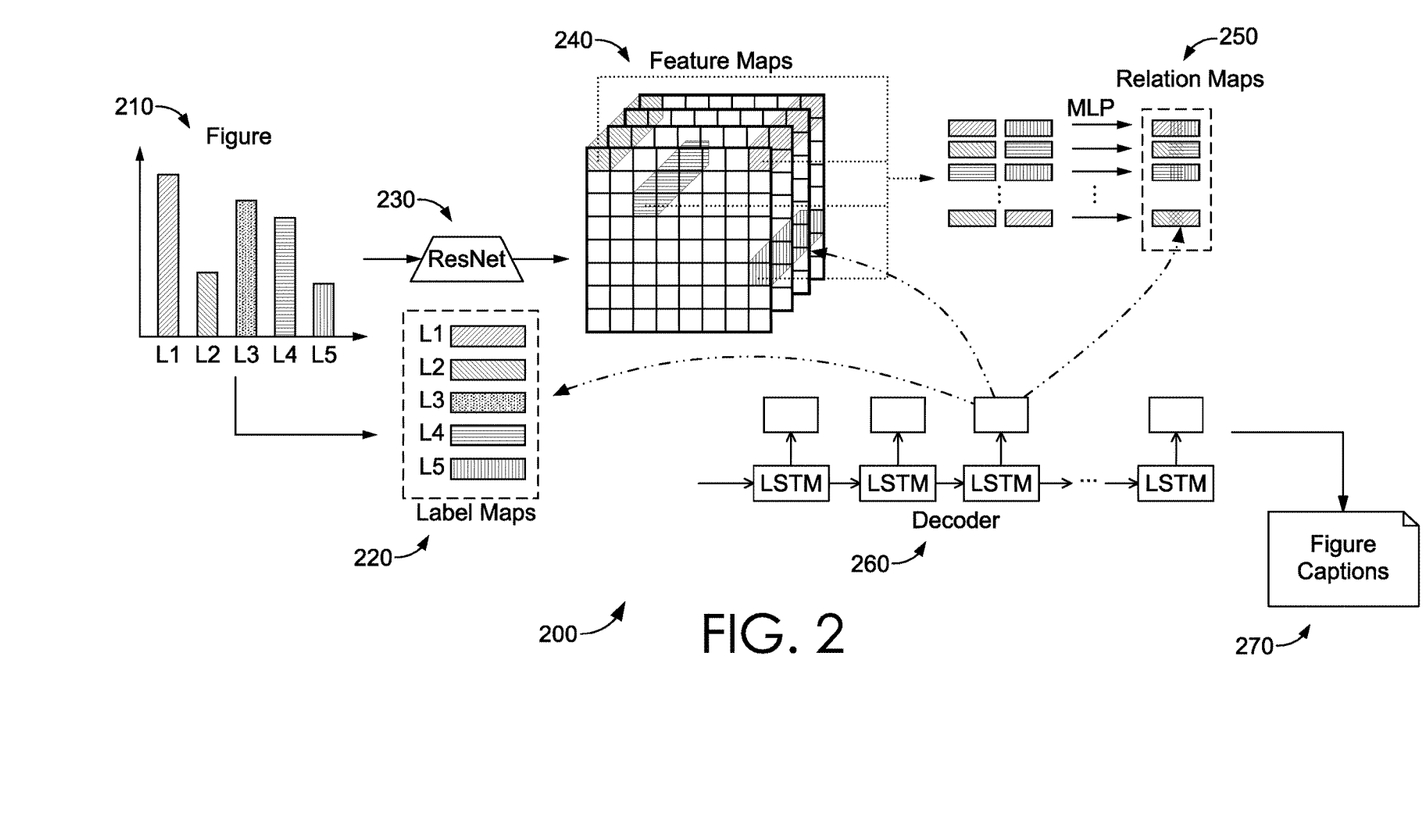
FIG. 2 is an exemplary schematic of a neural network host for generating a set of figure captions for an electronic figure in accordance with some embodiments of the present invention.

Referring now to FIG. 2, a flow diagram 200 is provided illustrating an exemplary process flow of a neural network host, such as neural network host 110 of FIG. 1, in accordance with various embodiments described herein. In various embodiments, the neural network host can comprise one or more computing devices, such as computing device 800 of FIG. 8, one or more neural networks, one or more hardware devices or components, and/or any number of networking components, operating in a local or distributed environment to facilitate the operations described herein.

At a high level, an electronic FIG. 210 is received by the neural network host as an input. The depicted electronic FIG. 210 presents a vertical bar graph with various shades associated with each bar. While the various bars are depicted with different shades, it is contemplated that any visible characteristic (e.g., color, patterns, shapes) can be employed to distinguish one bar from another. Each of the depicted bars of the electronic FIG. 210 represents a corresponding portion of a set of quantified data associated with the electronic FIG. 210. Each corresponding portion is also associated with a corresponding label (e.g., L1, L2, L3, L4, L5) that is presented to correspond with one of the depicted bars. It is contemplated that a label can correspond to a represented portion of a set of quantified data in a variety of ways, whether being closer in distance compared to other labels, being in vertical or horizontal alignment, being superimposed, or being defined via a legend, among other techniques considered within the purview of the present disclosure.

The neural network host can include a set of components that encodes the electronic FIG. 210 for processing. More specifically, the neural network host can parse or extract the labels from the received electronic FIG. 210 to generate a corresponding set of label maps 220, and further provide the received electronic FIG. 210 to a residual neural network 230 for further analysis. The residual neural network 230 can detect visible characteristics from the electronic FIG. 210 and generate a corresponding set of feature maps 240 therefrom. The generation of the set of feature maps 240 initializes a reasoning neural network that can generate a corresponding set of relation maps 250 based on the generated corresponding set of feature maps 240.

The neural network host can include another set of components that decodes the encoded electronic figure. In various embodiments, the decoder component(s) 260 can facilitate the generating of figure captions associated with the received electronic FIG. 210. More specifically, a recurrent neural network (e.g., a LSTM) can employ a set of attention mechanisms that calculates attention weights for one or more portions of the generated label maps 220, the generated feature maps 240, and/or the generated relation maps 250. The set of attention mechanisms can include operations that improve the decoding (i.e., the figure caption generation) processes of the neural network host. For instance, a label maps attention mechanism can enable the decoder to focus on specific labels parsed from the electronic FIG. 210, the feature maps attention mechanism can enable the decoder to focus on specific characteristics detected from the electronic FIG. 210, and the relation maps attention mechanism can enable the decoder to discover relationships between two or more labels and/or corresponding characteristics respectively parsed or detected from the electronic FIG. 210. Employing sequence-level training with reinforcement learning techniques for training the neural network host with a training dataset having a plurality of electronic figures and associated captions, the neural network host can effectively generate long sequence captions for the received electronic FIG. 210, while alleviating issues of exposure bias that is typically seen in long sequence generation.

Figure 3:
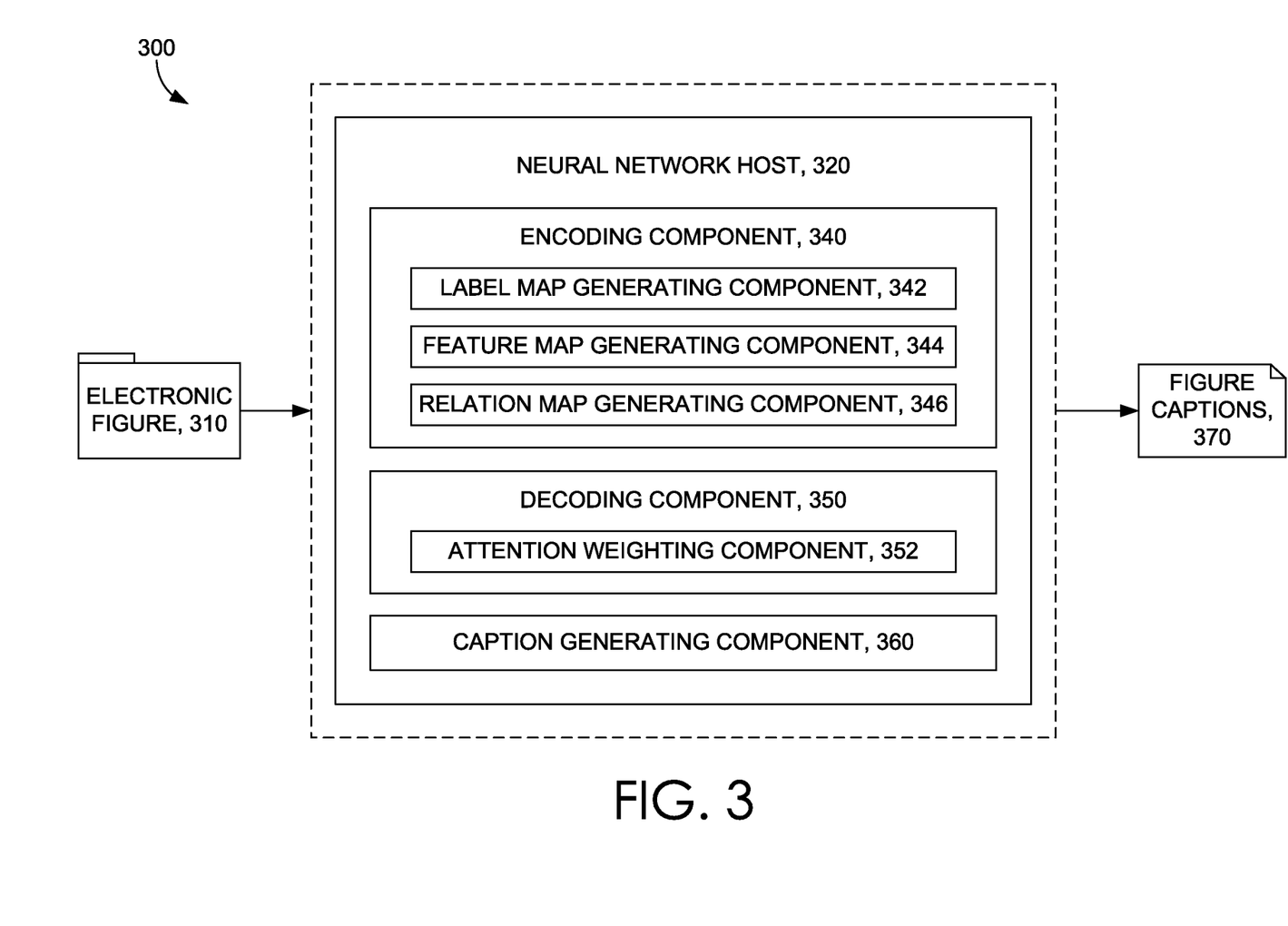
FIG. 3 is a block diagram of an exemplary system for implementing a neural network host for generating electronic figure captions in accordance with some embodiments of the present invention.

Looking now to FIG. 3, a block diagram is provided illustrating an exemplary system 300 having a neural network host, such as neural network host of FIG. 2. The system 300 can generate a set of figure captions for an electronic figure in accordance with various embodiments described herein. In various embodiments, the system 300 can comprise one or more computing devices, such as computing device 800 of FIG. 8, one or more neural networks, one or more hardware devices or components, and/or any number of networking components, operating in a local or distributed environment to facilitate the operations described herein.

Depicted in the system 300 is a neural network host 320 that can include, among other things, a figure receiving component 330, an encoding component 340, a decoding component 350, and a caption generating component 360. As each of the described components are depicted as being included in the neural network host 320 of system 300, it is contemplated that any component depicted therein is not limited to the illustrated embodiment, and can be distributed among a plurality of components or computing devices of system 300, or in some instances, may be conflated into a single component or module, such as a processor or other hardware device. It is also contemplated that any one or more of the described components can be completely removed from the system, so long as one or more operations described in correspondence to a removed component can be compensated for by one or more other components, or a third-party resource, remote computing device, or hardware device, among other things. Further, while no specific component is depicted corresponding to a set of neural networks itself, it is understood that the set of neural networks is comprised of or interfaces with one or more of the components depicted in system 300, or that one or more of the depicted components includes one or more portions of the set of neural networks. In this regard, a reference to the system 300, or the components thereof, can also correspond to any one or more of the various neural networks described in accordance with the present disclosure.

An electronic FIG. 310, such as a line graph, bar graph, histogram, pie figure, pictogram, Cartesian graph, or the like, can be obtained by neural network host 320. In some aspects, the electronic FIG. 310 can be received via a storage device coupled to the neural network host 320, or received via a network from a remote computing device, such as client device 120 of FIG. 1. The electronic FIG. 310 can be provided as an input (e.g., via a presented GUI or interface) to the neural network host 320, for purposes of generating figure captions for the received electronic FIG. 310.

The neural network host 320 includes encoding component 340 and decoding component 350, either of which can interface with a set of neural networks that have been trained (i.e., at least a portion of neurons of a plurality of neural network neurons having been modified) based on sequence-level training with reinforcement learning techniques utilized for analyzing and processing a training dataset having a plurality of electronic figures and corresponding figure captions.

On a high level, the encoding component 340 includes a label map generating component 342, a feature map generating component 344, and a relation map generating component 346, any of which can employ one or more neural networks trained in accordance with some embodiments described herein. The encoding component 340 can, in essence, generate multiple layers associated with an electronic FIG. 310 that can be employed for purposes of sequential generation of figure captions associated with the electronic FIG. 310. In some aspects, the various layers can correspond to a determined set of labels associated with an electronic FIG. 310, a determined set of relationships between labels associated with the electronic FIG. 310, and/or a determined set of characteristics associated with the electronic FIG. 310, among other things.

The label map generating component 342 can parse or extract certain qualitative data, more particularly labels, from the electronic FIG. 310 to generate a set of label maps for the electronic FIG. 310. A generated label map can include an embedding (e.g., a vector representation) of labels that appear on the electronic FIG. 310, such that the label map can include a number of vectors that corresponds to the number of labels appearing on the electronic FIG. 310. A label depicted on and/or associated with an electronic FIG. 310 can include a title, a data dimension, a variable name, a category, a date and/or time, an identifier, a value, a range, an axis name, or the like, or any combination thereof. As labels are generally in the form of alphanumeric characters, such qualitative data can be relatively easy to identify and parse from the electronic FIG. 310. In some aspects, the generated set of label maps can correspond to the labels associated with the electronic FIG. 310, and can include other detected information associated with each label (e.g., position, location, corresponding visible characteristics). In accordance with various embodiments, the set of label maps generated by the label map generating component 342 can be provided as one of a set of inputs to decoding component 350 for purposes of generating a corresponding figure caption.

The feature map generating component 344 can receive the electronic FIG. 310 as input, and employ a residual neural network (ResNet) to detect visible characteristics of the electronic FIG. 310 received as the input. In other words, figure X is used as the input of a ResNet as represented by ResNet(X). The residual neural network can generate a set of feature maps (F) having a plurality of feature vectors for the electronic FIG. 310 based on the various visible characteristics detected therein by the ResNet, as represented by F=ResNet(X). These visible characteristics can be qualitative and/or quantitative, and can include shade, color, shape, length, height, width, value, coordinates, number or count, or position, among other things. In some aspects, the generated set of feature maps can correspond to the detected characteristics presented in the electronic FIG. 310. In accordance with various embodiments, the set of feature maps (F) generated by the feature map generating component 344 can be provided as another one of a set of inputs to decoding component 350 for purposes of generating a corresponding figure caption.

The relation map generating component 346 can be initialized by the neural network host 320 based on the set of feature maps being generated. The set of feature maps generated by feature map generating component 344 can be provided as an input to the relation map generating component 346. The relation map generating component 346 can employ a reasoning neural network to detect relationships between two or more of the visible characteristics defined in the generated set of feature maps. Based on the relationships detected by the reasoning neural network, the relation map generating component 346 can generate a set of relation maps for the electronic FIG. 310. In accordance with various embodiments, the set of relation maps generated by the relation map generating component 346 can be provided as yet another one of a set of inputs to decoding component 350 for purposes of generating a corresponding figure caption.

The decoding component 350, on the other hand, can include or interface with a recurrent neural network (e.g., a LSTM), trained in accordance with some embodiments described herein, to generate figure captions for the electronic FIG. 310. In accordance with various embodiments, the set of feature maps, the set of relation maps, and the set of label maps, each generated as outputs by the encoding component 340 can be provided to the decoding component 350 as corresponding inputs.

In some embodiments, the recurrent neural network of decoding component 350 can be initialized by providing the generated feature maps (F) from the encoding component 340 as an input to the decoding component 350, per:

$$c_0 = \sigma(W_{Ic}F)$$

$$h_0 = \sigma(W_{Ih}F)$$

where $\sigma(.)$ is the sigmoid function, as one of skill in the art may appreciate. The figure caption for the electronic FIG. 310 can be preprocessed with a beginning of sentence "BOS" token in the beginning and an end of sentence "EOS" token in the end. A word ($y_t$) in the figure caption is represented with a one-hot vector ($1_{y,t}$), while the encoding ($1_{y,t}$) is further embedded by a linear embedding E, represented as:

$$e_t = e(y_t) = E1_{y,t}, t > 0$$

$$e_0 = 0, \text{otherwise}$$

with word vector ($e_t$) and context vector ($d_t$), which are employed as inputs to the recurrent neural network of decoding component 350. The signals for the input gate, forget gate, and output gate of the recurrent neural network are:

$$i_t = \sigma(W_{iy}e_t + W_{ih}h_{t-1} + W_{id}d_t + b_i)$$

$$f_t = \sigma(W_{fy}e_t + W_{fh}h_{t-1} + W_{fd}d_t + b_f)$$

$$o_t = \sigma(W_{oy}e_t + W_{oh}h_{t-1} + W_{od}d_t + b_o),$$

respectively, where $d_t$ is the context vector, $\sigma(.)$ is the sigmoid function, and $h_{t-1}$ corresponds to the output of the hidden layer in the recurrent neural network (e.g., LSTM). Provided the foregoing signals for the input gate ($i_t$), forget gate ($f_t$), and output gate ($o_t$), the hidden state vector or output vector ($h_t$) can be computed as:

$$c_t = i_t \odot \phi(W_{cy}^{\otimes}d_t + W_{ch}^{\otimes}h_{t-1} + W_{cd}^{\otimes}d_t + b_c^{\otimes}) + f_t \odot c_{t-1}$$

$$h_t = o_t \odot \tanh(c_t)$$

where $d_t$ is the context vector, $\tanh(.)$ is the hyperbolic tangent function, and $\phi(.)$ is the maxout non-linearity, as one of ordinary skill would appreciate. The recurrent neural network of decoding component 350 thus employs both the context vector ($d_t$) and output vector ($h_t$) to predict the next word ($y_t$), as follows:

$$\tilde{y}_t = \sigma(W_h h_t + W_d d_t)$$

$$y_t \sim \text{softmax}(\tilde{y}_t)$$

In some further embodiments, the input to the decoding component 350 can first be modified by an attention weighting component 352. More specifically, the decoding component 350 can employ a set of attention models that facilitate the generation of figure captions based on the outputs generated by encoding component 340. The set of attention models can include any of a feature maps attention model, a relation maps attention model, or a label maps attention model, any of which can receive one or more outputs (e.g., feature maps, relation maps, label maps) generated by encoding component 340 as input(s) for weighting and subsequent processing by decoding component 350. One or more of the attention models can calculate attention weights for at least a portion of such output(s) from encoding component 340 to facilitate the generation of figure captions for the electronic FIG. 310. In some embodiments, one of the foregoing attention models can be selected manually or automatically in accordance with various embodiments described herein. In various embodiments, while the input to the decoding component 350 is the same for an electronic figure, the attention weights calculated by attention weighting component 352 for one or more of the generated outputs (e.g., feature maps, relation maps, label maps) from encoding component 340 can be different depending on the attention models being utilized. In some aspects, the context vector ($d_t$) ultimately utilized as input to the decoding component 350 can be computed based on the utilized set of attention models, which can include any combination of the foregoing attention models.

A feature maps attention model (Att_F) can take the generated set of feature maps F, which contains m feature vectors (F ε $R^{m \times d}$), and the hidden state ($h_{t-1}$) of the recurrent neural network, as an input. For each feature ($f_j$) in F, the feature maps attention model can compute a score (e.g., a weight) between $f_j$ and $h_{t-1}$. Utilizing the computed scores as weights, the feature maps attention model computes the context vector ($c_t$) as the weighted sum of all visible characteristics included in the set of feature maps associated with the electronic FIG. 310. The feature maps attention model is represented by the following equation:

$$e_{tj} = \text{Att\_F}(h_{t-1}, f_j)$$
$$= v_a^T \tanh(W_a f_j + U_a h_{t-1})$$
$$\alpha_{tj} = \frac{\exp(e_{tj})}{\sum_{k=1}^{m} \exp(e_{tk})}$$
$$c_t = \sum_{k=1}^{m} \alpha_{tj} \cdot f_j$$

where $f_j$ corresponds to the j-th feature of the set of feature maps F, $c_t$ corresponds to the context vector, and $\alpha_{tj}$ is a corresponding attention weight.

A relation maps attention model (Att_R) can facilitate the generation of figure captions that appropriately describe relationships between the labels associated with the electronic FIG. 310. Relationships between labels can be interpreted as identified relationships between two or more labels of an electronic figure, such as electronic FIG. 310. In other words, an identified relationship can describe one label relative to at least one other label (e.g., "A is the maximum," "B is greater than C," or "C is less than D"). Provided with the generated set of feature maps F, each feature vector (F ε $R^d$) in the set of feature maps is considered as an object. The relation maps attention model can, for any two "objects" (e.g., $f_i$ and $f_j$) of the generated set of feature maps, concatenate the objects and communicate the vector into a multi-layer perceptron (MLP), which can result in a relation vector ($r_{ij}$ ε $R^d$):

$$r_{ij} = MLP(\text{concat}(f_i, f_j)) : r_{ij} \varepsilon R^d.$$

As such, the generated set of relation maps R can contain $m^2$ relation vectors (m corresponding to the number of feature vectors in the set of feature maps F). Provided the set of relation maps R, at decoding step t, the relation maps attention model can compute the relation context vector $\hat{c}_t$ as follows:

$$\hat{e}_{tk} = \text{Att\_R}(h_{t-1}, r_k)$$
$$= v_b^T \tanh(W_b r_k + U_b h_{t-1})$$
$$\beta_{tk} = \frac{\exp(\hat{e}_{tk})}{\sum_{l=1}^{m^2} \exp(\hat{e}_{tl})}$$
$$\hat{c}_t = \sum_{k=1}^{m^2} \beta_{tk} \cdot r_k$$

where $r_k$ corresponds to the k-th relation vector of the set of relation maps R, and $\beta_{tk}$ corresponds to an attention weight. It is contemplated that more complex relationships can be deduced from pairwise relationships, such as "A>B" and "B>C", so that "A>C", by way of non-limiting example. In light of the foregoing, the set of relation maps R obtained as input from the reasoning neural network of decoding component 350 can represent abstract objects that implicitly represent one or more object(s) depicted within the electronic FIG. 310, but not explicitly representing one specific object, such as a bar or a line.

A label maps attention model (Att_L) can attend to, or in other words cause the decoding component 350 to focus on the generated set of label maps (L) for purposes of decoding. The set of label maps generated by label map generating component 342 comprises a label vector for each label associated with the electronic FIG. 310, or in some embodiments, appearing visually on the electronic FIG. 310. It is contemplated that if n is the number of labels associated with the electronic FIG. 310, then the set of label maps (L) includes n vectors. Assuming that $l_j$ corresponds to the j-th vector in the set of label maps (L), the label maps attention model can be defined as:

$$\bar{e}_{tj} = \text{Att\_L}(h_{t-1}, l_j)$$
$$= v_c^T \tanh(W_c l_j + U_c h_{t-1})$$
$$\gamma_{tj} = \frac{\exp(\bar{e}_{tj})}{\sum_{j=1}^{n} \exp(\bar{e}_{tj})}$$
$$\bar{c}_t = \sum_{j=1}^{n} \gamma_{tj} \cdot l_j$$

where $\tilde{c}_t$ corresponds to the context vector at time step t.

Utilizing state-of-the-art computer vision technologies, such as optical character recognition (OCR), the set of figure labels associated with the electronic FIG. 310 are detected from the electronic FIG. 310 and further utilized as inputs to the attention weighting component 352 of decoding component 350. A set of labels associated with an electronic figure, such as electronic FIG. 310, are expected to also appear within a figure caption generated for the electronic figure. As such, instead of defining a new set of vectors to represent the set of labels within the generated set of label maps (L), the attention weighting component 352 utilizing a label maps attention model (Att_L) can generate a subset of the associated set of labels E. In some embodiments, such operations can correspond to those performed by label map generating component 342.

In accordance with various embodiments, decoding component 350 can utilize any combination of the described feature maps attention model (Att_F), relation maps attention model (Att_R), or label maps attention model (Att_L). For instance, if decoding component 350 utilizes all three attention models (Att_F, Att_R, and Att_L), the final context vector ($d_t$) utilized as input to the decoder is:

$$d_t = \text{concat}(c_t, \hat{c}_t, \tilde{c}_t)$$

Utilizing any of the foregoing described attention models, attention weighting component 352 can enable the decoding component 350 to prioritize, preferably consider, or in other words emphasize a focus on more accurate region(s) (e.g., heavily weighted portions) of an electronic figure. In this way, a more appropriate term (e.g., word) of a figure caption can be generated. The caption generating component 360, in some aspects, can finalize the generation of the set of figure captions 370 based on the generated terms. By way of example, the caption generating component 360 can facilitate modifications to a generated figure caption, such as correcting capitalization or adding punctuation (e.g., a period at the end of a figure caption), among other things. It is contemplated, however, that the decoding component 350 can effectively perform such functions, provided that the associated set of neural networks is properly trained in accordance with some embodiments described herein. By way of another example, the decoding component 350 can alternatively evaluate the input from a previous step (e.g., a previous word of a figure caption) to determine whether a word is a first term of a figure caption for purposes of properly capitalizing the term. In some embodiments, the caption generating component 360 can store in a memory the generated set of figure caption 370 in association with the provided electronic FIG. 310, whether in an associated file, embedded as hidden metadata, or embedded visually onto the electronic FIG. 310, among other things. In light of the above, it is contemplated that the set of neural networks employed by encoding component 340 and decoding component 350 can be trained to effectively generate such figure captions 370 in accordance with the following embodiments.

Figure 4:
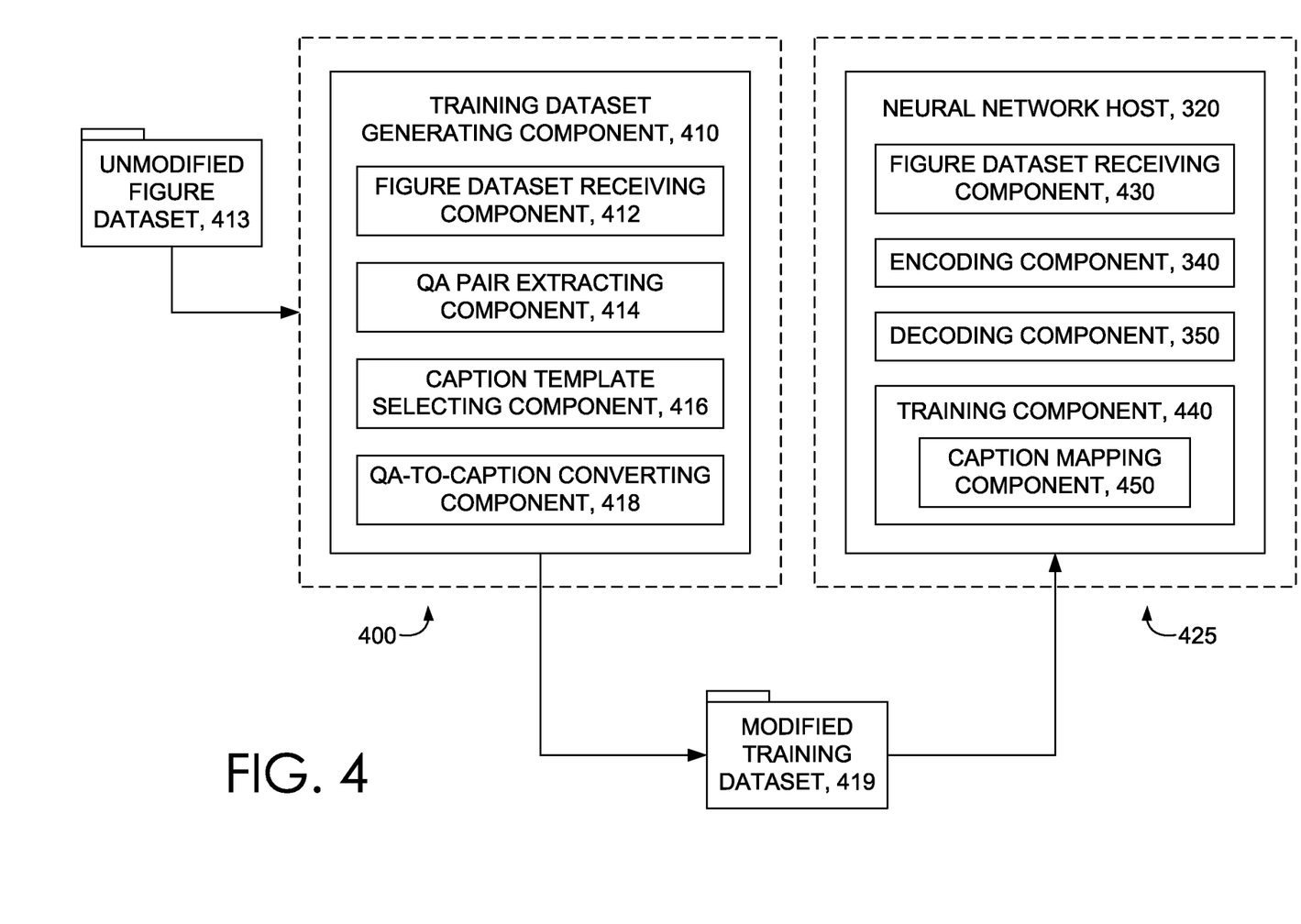
FIG. 4 is a block diagram of an exemplary system for generating a training dataset for purposes of training a neural network host in accordance with some embodiments of the present invention.

Looking now to FIG. 4, a block diagram is provided illustrating an exemplary system 400 for generating a training dataset for purposes of training a neural network host, such as neural network host of FIG. 2 and implemented by neural network host 320 of FIG. 3, in accordance with various embodiments described herein. In various embodiments, the system 400 can comprise one or more computing devices, such as computing device 800 of FIG. 8, one or more neural networks, one or more hardware devices or components, and/or any number of networking components, operating in a local or distributed environment to facilitate the operations described herein.

Depicted in the system 400 is a training dataset generating component 410 that can efficiently generate a proper training dataset to train a set of neural networks hosted by or employed by a neural network host, such as neural network host 320 of FIG. 3. As the training dataset generating component 410 is merely depicted on a component level, it is contemplated that the training dataset generating component 410 can be included in a client device, such as client device 120 of FIG. 1, or can be included as a component of the neural network host 320 or system 300.

The training dataset generating component 410 can include, among other things, an exemplary figure dataset receiving component 412, a question-answer ("QA") pair extracting component 414, a caption template selecting component 416, and a QA-to-caption converting component 418. As each of the described components are depicted as being included in the training dataset generating component 410, it is contemplated that any component depicted therein is not limited to the illustrated embodiment, and can be distributed among a plurality of components or computing devices, or in some instances, may be conflated into a single component or module, such as a processor or hardware device. It is also contemplated that any one or more of the described components can be completely removed from the system, so long as one or more operations described in correspondence to a removed component can be compensated for by one or more other components, or a third-party resource, among other things.

The figure dataset receiving component 412 can receive, among other things, an unmodified figure dataset 413 including one or more electronic figures, each electronic figure presenting a visual representation of a corresponding set of quantified data and an associated set of labels that each corresponds to at least a portion of the corresponding set of quantified data. In various embodiments, a visual representation presented in an electronic figure of the unmodified figure dataset can include a vertical or horizontal bar chart, a pie chart, a line plot, a dot-line plot, and the likes of other figures that depict a set of quantified data in visual format. Each electronic figure in the unmodified figure dataset can include and/or be associated with a corresponding set of question-answer pairs. A question-answer pair can include a question (e.g., in an alphanumeric text-based sentence) relating to one or more visible characteristics of the visual representation, and a generally brief answer (e.g., in an alphanumeric text-based sentence) that corresponds to the question. In some aspects, a figure dataset associated with a VQA system, such as one generated via a VQA system or retrieved from a data repository via a network (e.g., the Internet), can be employed as the electronic figures and associated question-answer pairs of an unmodified figure dataset.

The QA pair extracting component 414 can parse, from each electronic figure received via figure dataset receiving component 412, each question-answer pair associated with and/or embedded in the electronic figure. The question-answer pairs associated with an electronic figure can be formatted in a variety of manners, whether a sequence of terms is preceded with and/or concludes with an indication that the following terms are a question (e.g., "Q:", "Question:", "?") or an answer (e.g., "A:", "Answer:", "."), among other things. Typically, a question-answer pair may appear in sequence, have corresponding identifiers, appear on the same line, or any other variety of determinable formats to identify a question and corresponding answer.

The caption template selecting component 416 can select a caption template from a stored plurality of caption templates to convert each parsed question-answer pair into a sentence-like format. The caption template selecting component 416 can select a caption template in a variety of manners, whether in sequence, at random, or based on a set of rules. By way of non-limiting example, the caption template selecting component 416 can employ the set of rules that evaluate a question and/or an answer based on word count, content, context, number of identified subjects or characteristics, and the like. It is further contemplated that a variety of techniques for evaluating a question-answer pair to select a caption template can be employed, whether at random, in sequence, based on determined context(s), and/or other machine learning-based techniques.

The QA-to-caption converting component 418 can employ the selected caption template and convert a parsed question-answer pair into a natural language sentence-like format. More specifically, a selected caption template can be employed by QA-to-caption converting component 418 to convert data (e.g., the question and the answer) parsed from a question-answer pair into a ground truth (i.e., factual) natural language sentence. For instance, a question-answer pair can appear as "Q: Is this a pie chart?; A: Yes." As such, the QA-to-caption converting component 418 can thus select a caption template and convert the question-answer pair into a caption that recites, for example, "This is a pie chart." It is contemplated that a variety of techniques for converting a question-answer pair to a corresponding natural language sentence can be employed within the purview of the present disclosure, which can employ concepts of natural language processing, context extraction, and/or other rules-based techniques, among other things.

Once each question-answer pair associated with an electronic figure of the unmodified training dataset 413 is converted, and thus a set of captions associated with the electronic figure is generated, the generated set of captions can be stored to a memory in association with the electronic figure. In some aspects, the generated set of captions can be embedded (e.g., stored in) as metadata or presented visually on a face of the electronic figure. In some further aspects, the generated set of captions can replace an electronic figure's corresponding set of question-answer pairs. To this end, the training dataset generator 410 can generate a modified training dataset 419 (referenced hereinafter as a training dataset) having one or more electronic figures. Each electronic figure of the modified training dataset 419 can present a visual representation of a corresponding set of quantified data, having an associated set of labels that each corresponds to at least a portion of the corresponding set of quantified data. Moreover, each electronic figure of the modified training dataset 419 can further have a corresponding set of captions converted from a corresponding set of question-answer pairs, which describe in natural language one or more characteristics or relationships depicted by the visual representation. The foregoing is simply an exemplary embodiment of the present disclosure, and a variety of techniques for generating a modified training dataset 419 is within the purview of the various embodiments disclosed herein.

Also depicted in FIG. 4 is another system 425, like system 300 of FIG. 3, including a neural network host 320 that can further include, among other things, a figure receiving component 430 and a training component 440. As described in accordance with FIG. 3, the neural network host 320 can include the various components described in neural network host 320, such as the encoding component 340 and decoding component 350, among other things. As each of the described components are depicted as being included in the neural network host 320 of system 425, it is contemplated that any component depicted therein is not limited to the illustrated embodiment, and can be distributed among a plurality of components or computing devices of system 425, or in some instances, may be conflated into a single component or module, such as a processor or other hardware device. It is also contemplated that any one or more of the described components can be completely removed from the system, so long as one or more operations described in correspondence to a removed component can be compensated for by one or more other components, or a third-party resource, remote computing device, or hardware device, among other things. Further, while no specific component is depicted corresponding to a set of neural networks itself, it is understood that the set of neural networks is comprised of or interfaces with one or more of the components depicted in system 425, or that one or more of the depicted components includes one or more portions of the set of neural networks. In this regard, a reference to the system 425, or the components thereof, can also correspond to any one or more of the various neural networks described in accordance with the present disclosure. In some aspects, system 425 can correspond to system 300, having at least a portion of the additional components described herein with respect to FIG. 4.

In some embodiments, the figure receiving component 430 can obtain a training dataset, such as the modified training dataset 419. The training dataset can be received via any one of a training dataset generating component, such as training dataset generating component 410, an external or an internal memory device, a remote memory device via a network such as network 130 of FIG. 1, or a client device such as client device 120 of FIG. 1, among other things. In accordance with various embodiments, the training dataset 419 includes one or more electronic figures, each electronic figure presenting a visual representation of a corresponding set of quantified data, and having an associated set of labels that each corresponds to at least a portion of the corresponding set of quantified data. Each electronic figure of the obtained training dataset 419 further includes or is associated with a corresponding set of captions that describe in natural language one or more characteristics or relationships depicted by the visual representation.

The training component 440 of neural network host 320 can provide the obtained training dataset 419 to the set of neural networks of encoding component 340 and decoding component 350 configured in accordance with neural network host of FIG. 2. The training component 440 provides each electronic figure and associated figure captions of the obtained training dataset 419 as inputs to the set of neural networks for training. As described herein, the set of neural networks are configured in an encoder-decoder model framework, whereby the neural networks included in or employed by encoding component 340 and decoding component 350 can receive the electronic figures and corresponding sets of captions, analyze the electronic figures to detect visible characteristics, extract or parse associated labels, and employ caption mapping component 450 to generate one or more figure caption generating models that can establish high confidence relationships between an electronic figure (e.g., detected visible characteristics, relationships, labels) and their corresponding sets of figure captions, in accordance with a sequence-level training with reinforced learning technique. It is further contemplated that any combination of the aforementioned attention models employed by decoding component 350 can also be trained in accordance with the sequence-level training with reinforced learning technique.

As described herein, the encoding component 340 can determine various layers associated with an electronic figure. The decoding component 350 can include attention mechanisms that can facilitate various levels of emphasis in the evaluation of such layers to facilitate the generation of figure captions. In this regard, the training component 440 can facilitate the generation of rulesets employable by the neural network host 320, which are employable to define an analytic process for employment when receiving an electronic figure for purposes of generating a corresponding set of figure captions. In essence, the training component 440, utilizing caption mapping component 450, provides reinforcing data (e.g., corresponding captions) to the neural network, such that detectable visible characteristics, relationships, and labels of an electronic figure can be determined to correspond to certain figure captions. In general terms, this reinforced learning process may require a substantially sized training dataset to establish strong correlations between various figure captions and detectable characteristics of an electronic figure to develop a strong "intuition" (e.g., high confidence determination), so to speak, when sequentially determining terms in the process of figure caption generation.

Figure 5:
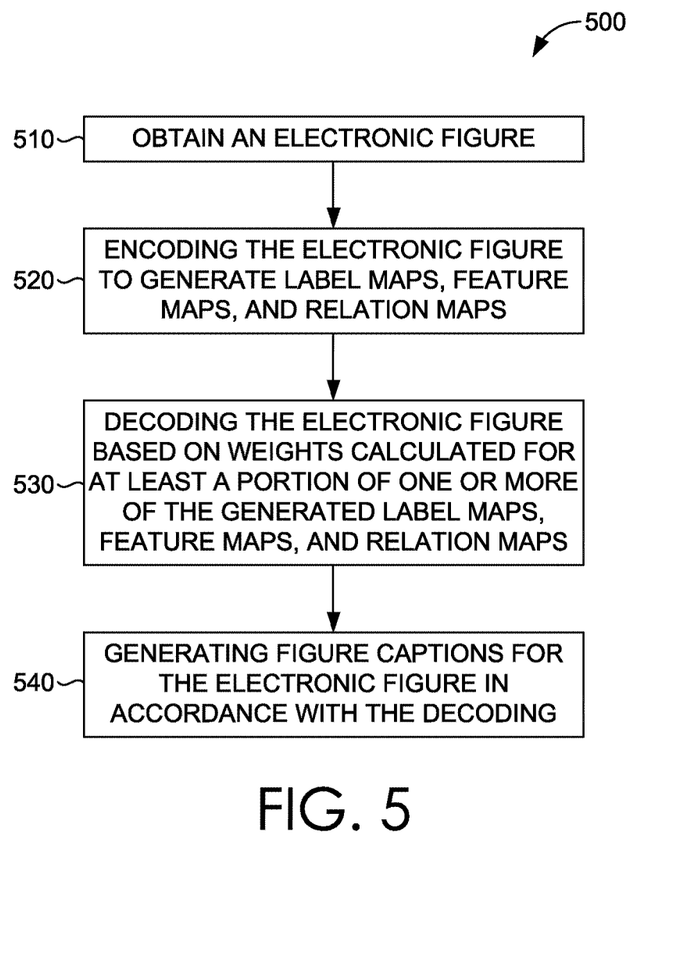
FIG. 5 is a flow diagram showing a method for generating a set of figure captions for an electronic figure in accordance with some embodiments of the present invention.

Turning now to FIG. 5, a flow diagram is provided that illustrates a method for generating a set of figure captions for an electronic figure, in accordance with some embodiments described herein. In some embodiments, a neural network host, such as neural network host 320 of FIG. 3, can obtain, at step 510, an electronic figure that includes, among other things, a visual or graphical representation (e.g., a depiction) of a set of quantified data and a set of labels associated with the visually-represented set of quantified data. The set of quantified data can be visually-represented in a variety of electronic figure layouts, such as in the form of a line graph, a bar graph, a histogram, a pie figure, a pictogram, or a Cartesian graph, by way of non-limiting example. As described herein, the neural network host can include an encoding component and a decoding component, such as encoding component 340 and a decoding component 350 of FIG. 3, respectively, each of which can include or can interface with a corresponding subset of neural networks to perform a corresponding set of operations described herein.

The obtained electronic figure is provided as an input to the encoding component. The encoding component can, among other things, encode the electronic figure based on the received electronic figure. At step 520, the encoding component can generate a set of label maps, a set of feature maps, and a set of relation maps for the electronic figure. The set of label maps can be generated based on the set of labels associated with the electronic figure. For instance, the set of label maps can be generated by parsing the electronic figure or an associated file, to extract therefrom the associated labels. In some instances, the associated set of labels can be identified utilizing OCR technology, or other text-recognition technologies. The encoding component can also generate a set of feature maps and a set of relation maps for the electronic figure. The encoding component can generate the set of feature maps based on detected characteristics of the visual representation included in the electronic figure. As described herein, visible characteristics can include colors, values, shapes, labels, lengths, widths, heights, directions, angles, distances, or any other visible characteristic that can be determined utilizing visual detection aspects of a residual neural network described in accordance with some embodiments herein. The encoding component can further generate the set of relation maps based on the generated set of feature maps. The encoding component can employ a reasoning neural network to determine relationships between two or more determined labels and/or detected characteristics, and generate based on the determination, a corresponding set of relation maps.

Provided that the encoding component has generated, based on the input electronic figure, a corresponding set of feature maps, relation maps, and label maps, the decoding component can, at step 530, employ a recurrent neural network (e.g., a LSTM) to decode the encoded electronic figure (e.g., the generated corresponding sets of feature maps, relation maps, and label maps) utilizing one or more attention mechanisms, such as those described in accordance with attention weighting component 352. The decoding component can receive the corresponding set of feature maps, relation maps, and/or label maps, and based on one or more selected attention mechanisms directed to emphasizing attention to one of the feature maps, relation maps, and/or label maps (as described in accordance with attention weighting component 352 of FIG. 3), calculate weights for at least a portion of the maps to facilitate the sequential selection of terms that can be employed for generating a corresponding figure caption.

In accordance with the decoding of the encoded electronic figure, the neural network host can begin sequentially selecting terms to generate, at step 540, a corresponding set of figure captions based on one or more weights calculated for various combinations (i.e., different weighted sums) of the feature maps, relation maps, and/or label maps. In some aspects, the neural network host can employ a caption generating component, such as caption generating component 360 of FIG. 3, to receive at least a portion of a generated sequence of terms having a highest calculated level of confidence from the recurrent neural network. The caption generating component can save in a cache or memory, at one or more intervals, one or more portions of the generated sequence of terms as a most probable figure caption that corresponds to the obtained electronic figure. In some aspects, the caption generating component can save, once the most probable set of figure captions is generated, the generated set of figure captions in association with the electronic figure. In some aspects, the generated set of figure captions can be saved in a file associated with the electronic figure, embedded as metadata with the electronic figure, or as a visible element on the face of the electronic figure.

Figure 6:
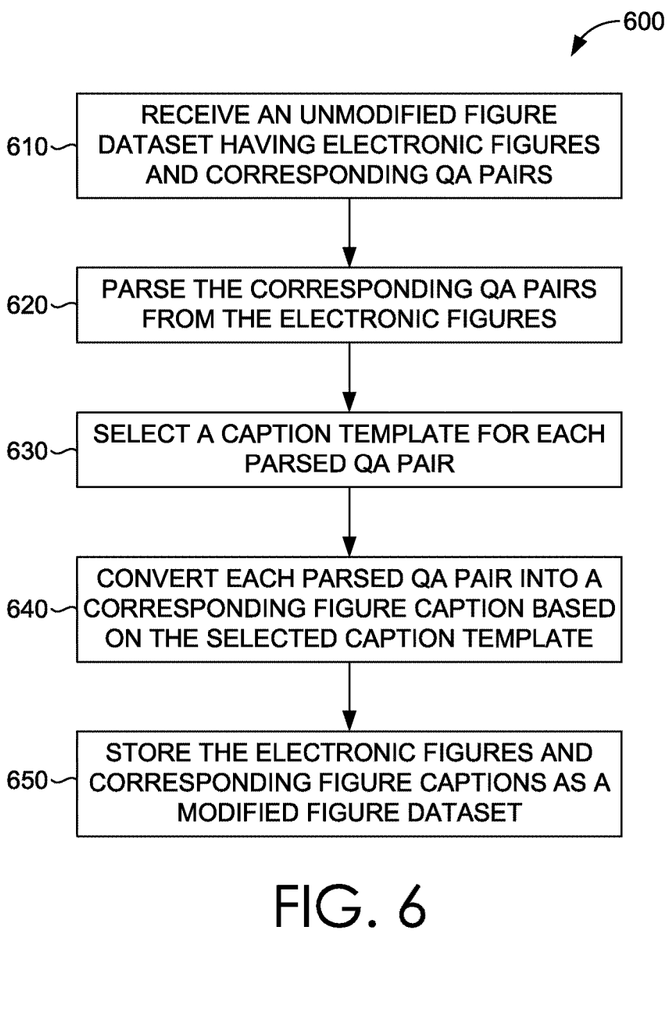
FIG. 6 is a flow diagram showing a method for generating a training dataset that is employable to train a set of neural networks that generates figure captions for an electronic figure in accordance with some embodiments of the present invention.

Turning now to FIG. 6, a flow diagram is provided that illustrates a method for generating a training dataset that is employable to train a set of neural networks that generate figure captions for an electronic figure, in accordance with some embodiments described herein. At step 610, a computing system having a training dataset generating component, such as training dataset generating component 410 of FIG. 4, can receive an unmodified figure dataset having a plurality of electronic figures that each includes, among other things, a visual or graphical representation (e.g., a depiction) of a set of quantified data and a set of labels associated with the visually-represented set of quantified data. Each electronic figure of the unmodified figure dataset can also include a corresponding set of question-answer (QA) pairs, each question-answer pair having a question directed to one or more visible characteristics, relationships, and/or labels associated with the electronic figure, and a corresponding answer to the question. In some aspects, the training dataset generating component can receive the unmodified figure dataset from a memory device or a remote computing device.

At step 620, the training dataset generating component can parse or extract, from each electronic figure of the unmodified figure dataset or from a file associated with the electronic figure, the corresponding set of question-answer pairs. The training dataset generating component can further select, at step 630, one of a plurality of defined figure caption templates, stored in a memory, to convert, at step 640, each question-answer pair associated with the electronic figure into a corresponding natural language figure caption. In some aspects, a figure caption template can be selected in a variety of ways, whether at random, sequentially, or intelligently based on context or other rules-based techniques described herein in accordance with caption template selecting component 416 of FIG. 4.

Once a set of figure captions for each electronic figure of the unmodified figure dataset is generated (e.g., converted from a corresponding set of question-answer pairs), the training dataset generating component can, at step 650, save the generated sets of figure captions in association with their corresponding electronic figures. In some aspects, the question-answer pairs of each electronic figure can be removed from the generated figure captions. In some further aspects, the generated figure captions can replace the removed question-answer pairs. In some other aspects, the generated figure captions can be saved in association with their corresponding electronic figures (e.g., saved in metadata). Each of the modified electronic figures, now having an associated set of figure captions, can be saved to a memory. In some further embodiments, the modified electronic figures, now a modified training dataset, can be provided to a neural network host, such as neural network host 320 of FIG. 3, to train a set of neural networks that are employable, once trained, to generate figure captions that correspond to electronic figures provided thereto.

Figure 7:
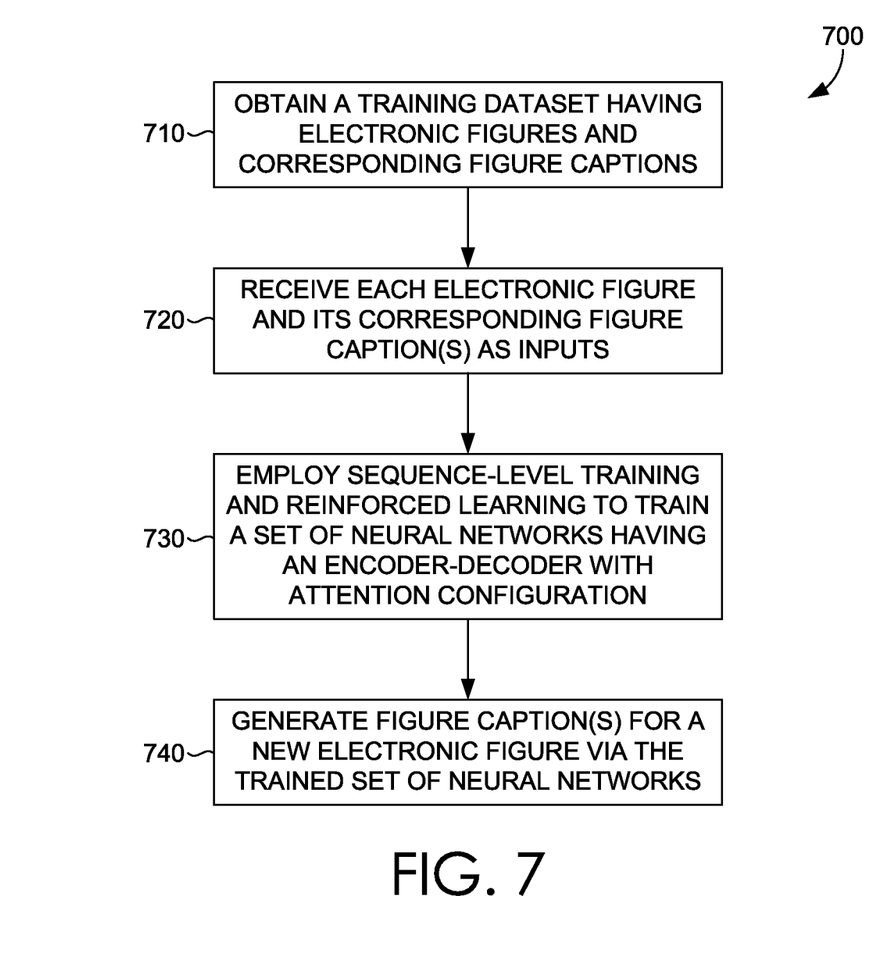
FIG. 7 is a flow diagram showing another method for training a set of neural networks that, once trained, is employable to generate figure captions that correspond to provided electronic figures in accordance with some embodiments of the present invention.

Turning now to FIG. 7, a flow diagram is provided that illustrates a method for training a set of neural networks, such as the set of neural networks configured as neural network host 200 of FIG. 2 and implemented by neural network host 320 of FIG. 3, that are employable, once trained, to generate figure captions that correspond to electronic figures provided thereto. At step 710, a training dataset is obtained by a neural network host, such as neural network host 320 of FIG. 3. The obtained training dataset can include a plurality of electronic figures that each has, among other things, a visual or graphical representation (e.g., a depiction) of a set of quantified data and a set of labels associated with the visually-represented set of quantified data. Each electronic figure of the obtained figure dataset can also include a corresponding set of figure captions.

As described in accordance with neural network host 320 of FIG. 3, the neural network host can include an encoding component that generates a set of label maps based on a set of labels associated with a provided electronic figure, employ a residual neural network for generating a set of feature maps based on detected visual characteristics the provided electronic figure, and further employ a reasoning neural network for generating a set of relation maps based on the generated set of feature maps, among other things. The neural network host can also include a decoding component that employs a recurrent neural network (e.g., a LSTM) that adopts one or more attention mechanisms to calculate weights directed to any one or more of the generated set of feature maps, label maps, and/or relation maps.

At step 720, a training component of the neural network host, such as training component 440 of FIG. 4, can receive each electronic figure and corresponding set of captions from the obtained training dataset as inputs. The training component can provide the electronic figures to the encoding component, and the corresponding set of captions to the decoding component. The training component can, at step 730, employ a sequence-level training with reinforced learning technique to train the neural networks employed by the encoding and decoding components, such that various rulesets can be defined based on the generated sets of label maps, feature maps, relation maps, and the corresponding sets of figure captions. In this way, the defined rulesets can be employed to generate or train a neural network model, such as one provided by the neural network host described in accordance with FIG. 2. At step 740, the generated neural network host can be employed to receive electronic figures and generate corresponding figure captions for the received electronic figures, in accordance with some embodiments described herein.

Figure 8:
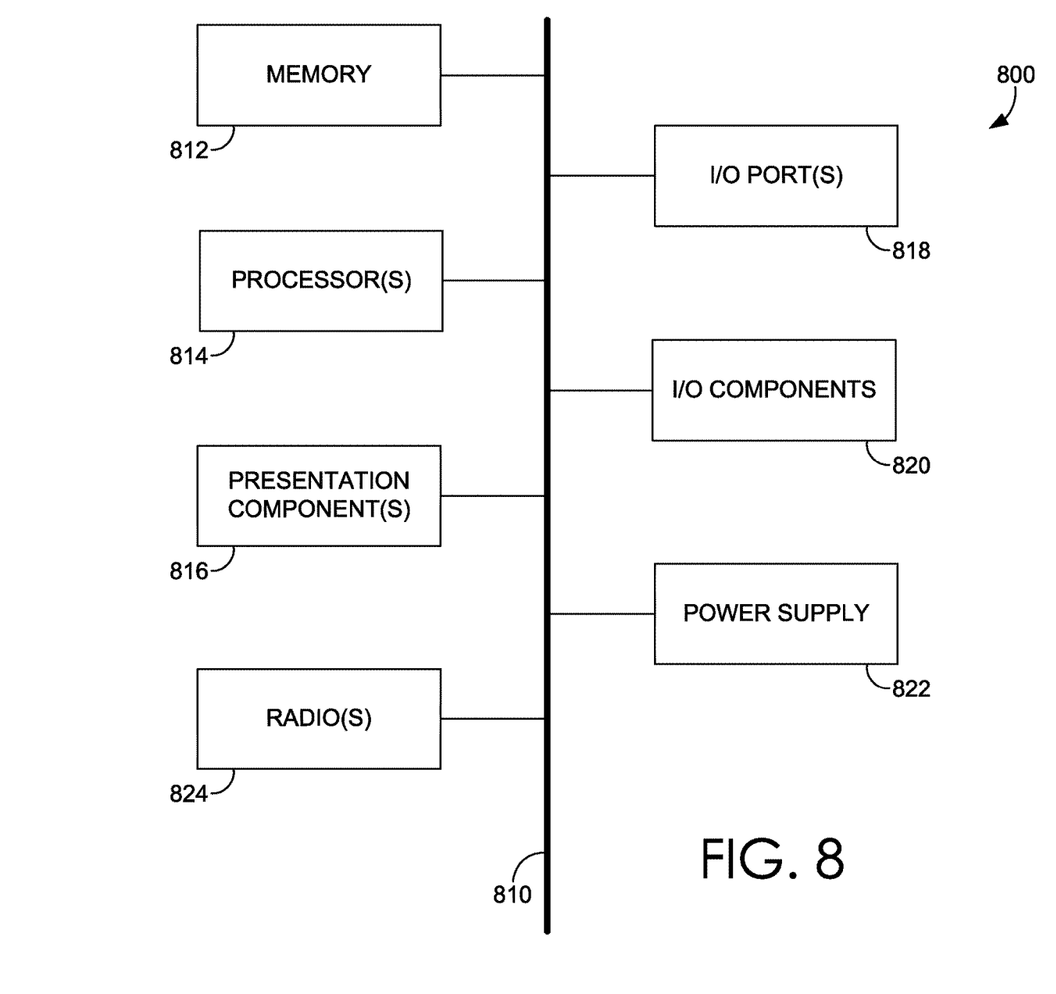
FIG. 8 is a block diagram of an exemplary computing environment suitable for use in implementing some embodiments of the present invention.

Having described embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output (I/O) ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 8 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be equipped with depth cameras, such as stereoscopic camera systems, infrared camera systems, RGB camera systems, touchscreen technology, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

As can be understood, embodiments of the present invention provide for, among other things, generating figure captions for electronic figures. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A non-transitory computer storage medium storing computer-useable instructions that, when used by one or more computing devices, cause the one or more computing devices to perform operations comprising:
   obtaining an electronic figure that includes a visual representation of a set of quantified data and a set of labels associated with the visually-represented set of quantified data;
   encoding the electronic figure, based on detected characteristics of the visual representation or the associated set of labels, by generating a set of label maps, a set of feature maps, and a set of relation maps for the electronic figure;
   decoding the encoded electronic figure utilizing weights calculated for at least one of the generated set of feature maps, the generated set of relation maps, or the generated set of label maps; and
   generating, in accordance with the decoding, a set of captions for the electronic figure, wherein the set of captions describes the visually-represented set of quantified data.

2. The medium of claim 1, wherein the set of relation maps is generated based on the generated set of feature maps.

3. The medium of claim 1, wherein a residual neural network and a reasoning neural network is employed to encode the electronic figure.

4. The medium of claim 1, wherein the weights are calculated based on at least one attention model comprising a feature maps attention model, a relation maps attention model, or a label maps attention model.

5. The medium of claim 4, wherein each attention model is generated based on a training dataset that includes a plurality of electronic figures, each figure in the plurality of electronic figures including a corresponding visual representation of a corresponding set of quantified data, a corresponding set of labels associated with the corresponding visual representation, and further being associated with a corresponding set of captions that describes characteristics of the corresponding visual representation.

6. The medium of claim 5, wherein each attention model is generated based further on a set of neural networks adapted for figure sequence level training with reinforced learning.

7. The medium of claim 5, wherein the corresponding set of captions is generated, for each figure in the plurality of electronic figures, based on a corresponding set of question-answer pairs, each question-answer pair in the corresponding set of question-answer pairs corresponding to at least one visible characteristic of the corresponding visual representation.

8. The medium of claim 7, wherein the corresponding set of captions generated for each figure includes at least one high-level caption and at least one detailed caption.

9. The medium of claim 7, wherein the corresponding set of captions is generated, for each figure in the plurality of electronic figures, based further on at least one figure caption template of a stored plurality of defined figure caption templates.

10. The medium of claim 1, wherein a characteristic corresponds to at least one of an electronic figure type, a color, a value, a shape, a relative relationship, a relative position, a label, or a number of labels, each corresponding to at least a portion of the visually-represented set of quantified data.

11. The medium of claim 10, wherein the electronic figure type comprises a line graph, a bar graph, a histogram, a pie figure, a pictogram, a Cartesian graph, or other electronic figure format.

12. The medium of claim 1, wherein a caption includes a natural language sentence.

13. A computer-implemented method for generating figure captions, the method comprising:
 obtaining, by a computing device, an electronic figure that includes a visual representation of a set of quantified data and a set of labels associated with the set of quantified data;
 generating, by the computing device, a set of label maps for the electronic figure based on the associated set of labels;
 generating, by the computing device, a set of feature maps and a set of relation maps for the electronic figure based on detected characteristics of the visual representation;
 generating, by the computing device, a set of captions that each describe the detected characteristics of the visual representation based on weights calculated for at least one of the generated set of feature maps, the generated set of relation maps, or the generated set of label maps; and
 storing, by the computing device, the electronic figure in association with the generated set of captions.

14. The method of claim 13, wherein the set of relation maps is generated based on the generated set of feature maps.

15. The method of claim 13, wherein the weights are calculated based on at least one attention model comprising a feature maps attention model, a relation maps attention model, or a label maps attention model.

16. The method of claim 13, wherein a residual neural network is employed to generate the set of feature maps, a reasoning neural network is employed to generate the set of relation maps, and a recurrent neural network is employed to generate the set of captions based on the at least one attention model.

17. The method of claim 16, wherein each neural network is trained based on a training dataset including a plurality of electronic figures, each figure in the plurality of electronic figures including a corresponding visual representation of a corresponding set of quantified data, a corresponding set of labels associated with the corresponding visual representation, and further being associated with a corresponding set of generated captions that describes characteristics of the corresponding visual representation.

18. A computerized system comprising:
 a label map generating means for generating a set of label maps for an electronic figure based on a set of labels associated with a visually-represented set of quantified data included in a received electronic figure;
 a feature map generating means for generating a set of feature maps for the received electronic figure based on visual characteristics detected from the visually-represented set of quantified data included in received electronic figure;
 a relation map generating means for generating a set of relation maps for the electronic figure based on the generated set of feature maps; and
 a caption generating means for generating a set of captions that describes the visually-represented set of quantified data included in the received electronic figure based on weights calculated for at least one of the generated set of label maps, the generated set of feature maps, or the generated set of relation maps.

19. The computerized system of claim 18, further comprising:
 a training dataset generating means for converting a corresponding set of question-answer pairs, associated with each figure in a plurality of electronic figures of a training dataset, into a corresponding set of captions associated with the figure, wherein each question-answer pair in the corresponding set of question-answer pairs corresponds to at least one visible characteristic of a corresponding visual representation of quantified data included in the figure, and the corresponding set of captions includes at least one natural language sentence.

20. The computerized system of claim 19, further comprising:
 a neural network model training means for generating at least one of a feature maps attention model, a relation maps attention model, or a label maps attention model for calculating the weights based on the training dataset and the corresponding sets of captions, wherein each generated attention model is employable by the caption generating means to generate the set of captions.

\* \* \* \* \*